United States Patent
Chen

(10) Patent No.: US 6,386,705 B1
(45) Date of Patent: May 14, 2002

(54) ONE-PIECE LENS NOSE-PAD ASSEMBLY

(75) Inventor: Chih-Lung Chen, Tainan (TW)

(73) Assignee: High Rainbow Ent. Co., Ltd., Tainan (TW)

(*) Notice: Subject to any disclaimer, the term of this patent is extended or adjusted under 35 U.S.C. 154(b) by 0 days.

(21) Appl. No.: 09/865,433

(22) Filed: May 29, 2001

(51) Int. Cl.$^7$ .............................. G02C 5/12; G02C 1/00
(52) U.S. Cl. ........................... 351/138; 351/78; 351/80; 351/136
(58) Field of Search .................................. 351/138, 136, 351/137, 139, 65, 76, 78, 80, 81

(56) References Cited

U.S. PATENT DOCUMENTS 5,646,707 A * 7/1997 Arnette ........................ 351/138

* cited by examiner

Primary Examiner—Hung Xuan Dang
(74) Attorney, Agent, or Firm—Rosenberg Klein & Lee

(57) ABSTRACT

A one-piece lens nose-pad assembly includes a nose-pad and a one-piece lens. The nose-pad has a pair of inserting portions. Each inserting portion has a mounting rod on the front, a hollow in the center and a dented curve on the rear surface. The one-piece lens has a nose-pad cutout portion in the bottom edge to receive the nose-pad. The cutout portion is provided with a lateral concave and a barb in each side. A protruding block is formed between each lateral concave and barb. Each protruding block is inserted into each hollow of the inserting portion so as for each mounting rod to be secured to each side of the cutout portion with both ends of each mounting rod respectively inlaid in each lateral concave and barb.

1 Claim, 5 Drawing Sheets

ONE-PIECE LENS NOSE-PAD ASSEMBLY

BACKGROUND OF THE INVENTION

1. Field of the Invention

This invention relates to a one-piece lens nose-pad assembly with innovatory convenience and comfort features, and more particularly to a one-piece lens nose-pad assembly that can be easily assembled, and whose soft and thin nose-pad can fit different sized faces so as to let every wearer feel comfortable.

2. Description of the Related Art

There are more and more people who have poor eyesight and must wear eyeglasses to obtain better eyesight. Besides, most people like to do outdoor activities, and they must wear sunglasses to prevent strong sunrays from hurting their eyes. Many people whose eyes may be hurt by strong rays while working must wear industrial safety glasses to protect their eyes. Therefore, various kinds of glasses are indispensable for modern people in daily life.

Presently, there are many various forms of sunglasses and safety glasses that have a one-piece lens 4, as shown in FIG. 1. The one-piece lens 4 has a nose-pad cutout portion in the bottom edge. The cutout portion is formed as a curve 41 to receive a nose-pad assembly 3.

The nose-pad assembly 3 is best understood by referring to FIGS. 1,2 and 2-1. The nose-pad assembly 3 is assembled by a rear half member 31 and a front half member 32. The rear half member 31 made of rubber has a plurality of vertically spaced recesses 312 in the front surface, and the front half member 32 made of plastic has a groove 33 in the top and a plurality of posts 321 extending rearwardly therefrom.

While being assembled, the rear half member 31 and the front half member 32 are combined together with a plurality of posts 321 respectively being inserted into each recess 312 to form a whole nose-pad assembly 3, and then the nose-pad assembly 3 is secured to the cutout portion of one-piece lens 4 with the curve 41 being received in the groove 33.

However, the above-mentioned conventional nose-pad assembly 3 can not fit different sized noses of wearers because the rear half member 31 does not have the effect of expansion, and a wearer with a bigger nose will feel tight on the nose, and it is not easy to be assembled and costs much.

SUMMARY OF THE INVENTION

Therefore, the present invention is, to provide a one-piece lens nose-pad assembly that substantially obviates the drawback of the related conventional art.

An objective of the present invention is to provide a one-piece lens nose-pad assembly which is easier to be assembled and saves cost.

Another objective of the present invention is to provide a one-piece lens nose-pad assembly whose both soft rubber pads are respectively provided with a dented curve so as for a wearer with a bigger nose to feel comfortable.

Accordingly, a one-piece lens nose-pad assembly in the present invention includes a one-piece lens and a nose-pad. The nose-pad made of soft rubber is provided with a pair of inserting portions respectively on the left and right sides. Each inserting portion has a mounting rod on the front, a hollow in the center and a dented curve provided on the rear surface. The one-piece lens has a nose-pad cutout portion in the bottom edge to receive the nose-pad. The cutout portion is provided with a lateral concave in the upper section of each side and a barb in the middle of each side. A protruding block is formed between each lateral concave and barb on each side of the cutout portion. Each protruding block is inserted into each hollow of the inserting portion so as for each mounting rod to be secured to each side of the cutout portion with both ends of each mounting rod respectively inlaid in each lateral concave and barb.

BRIEF DESCRIPTION OF THE DRAWINGS

Other features and advantages of the present invention will become apparent in the following detailed description of the preferred embodiments with reference to the accompanying drawings, in which

FIG. 2-1 is a cross sectional view taken along lines A—A of FIG. 2;

FIG. 4-1 is a cross sectional view taken along lines A—A of FIG. 4;

DETAILED DESCRIPTION OF THE PREFERRED EMBODIMENTS

Figure 3:
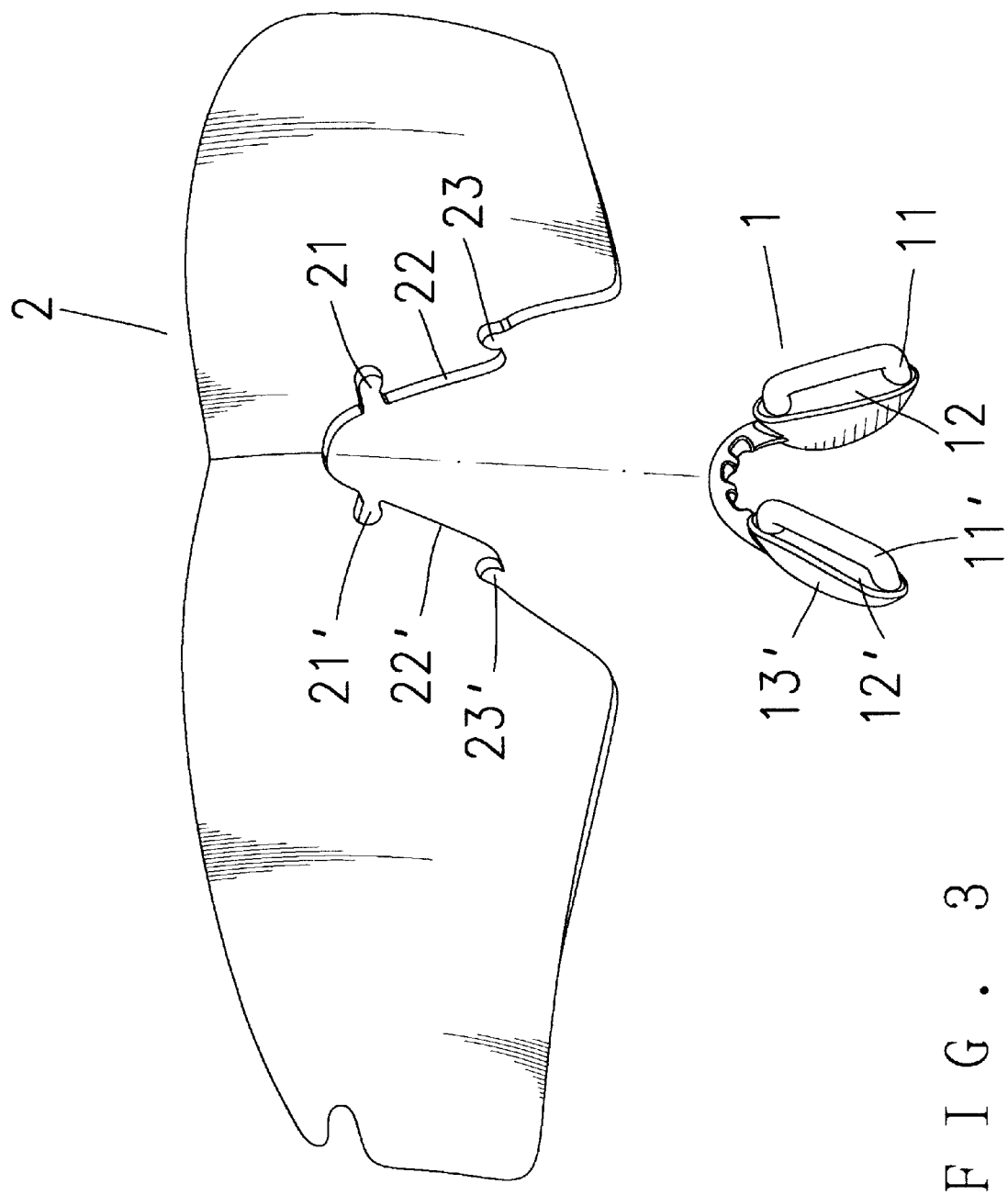
FIG. 3 is an exploded perspective view of an embodiment of the one-piece lens nose-pad assembly in accordance with the present invention.

Referring to FIG. 3, a one-piece lens nose-pad assembly in the present invention includes a nose-pad 1 and a one-piece lens 2.

The nose-pad 1 made of soft rubber is provided with a pair of inserting portions respectively on the left and right sides. Each inserting portion has a mounting rod 11 or 11' on the front, a hollow 12 or 12' in the center and a dented curve 13 or 13' provided on the rear surface.

The one-piece lens 2 has a nose-pad cutout portion in the bottom edge to receive the nose-pad 1. The cutout portion is provided with a lateral concave 21 or 21' in the upper section of each side and a barb 23 or 23' in the middle of each side. A protruding block 22 or 22' is formed between each lateral concave 21 or 21' and each barb 23 or 23' on each side of the cutout portion.

Figure 1:
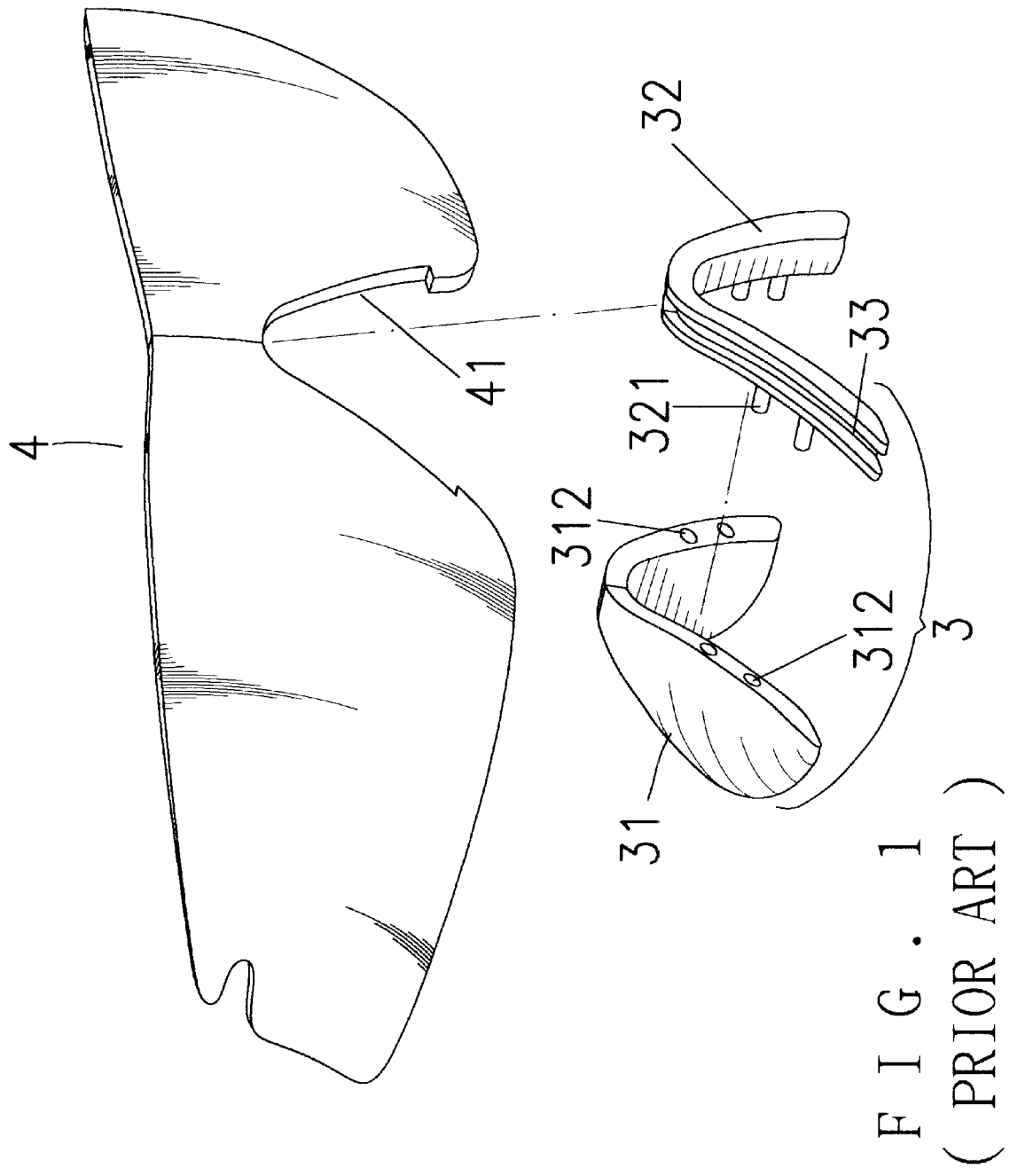
FIG. 1 is an exploded perspective view of a conventional one-piece lens nose-pad assembly.
Figures 1, 2:
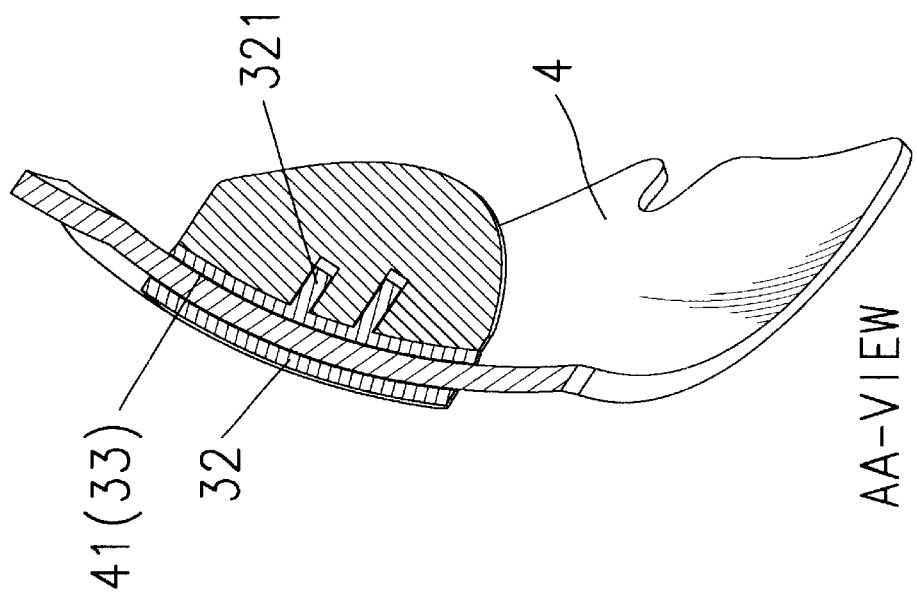
FIG. 2 is a front view of a conventional one-piece lens nose-pad assembly in an assembled configuration.
Figure 2:
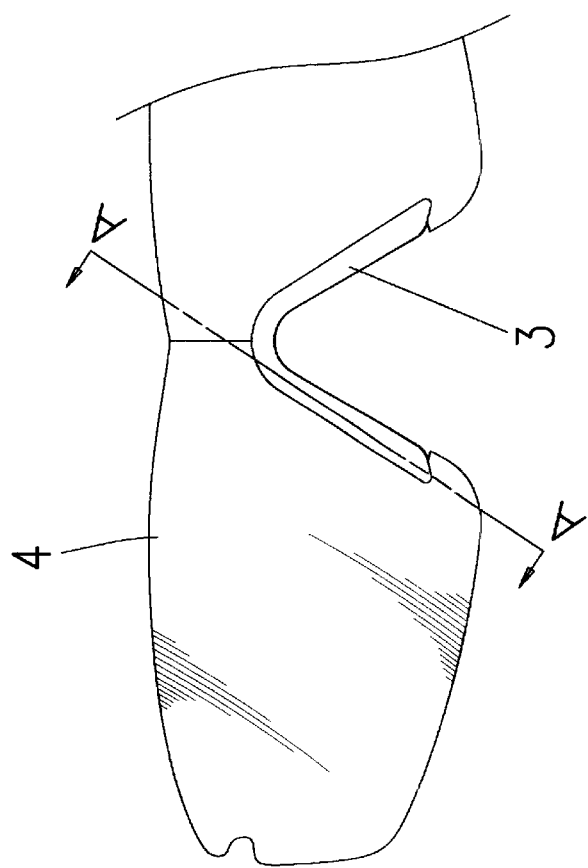
Figures 1, 4:
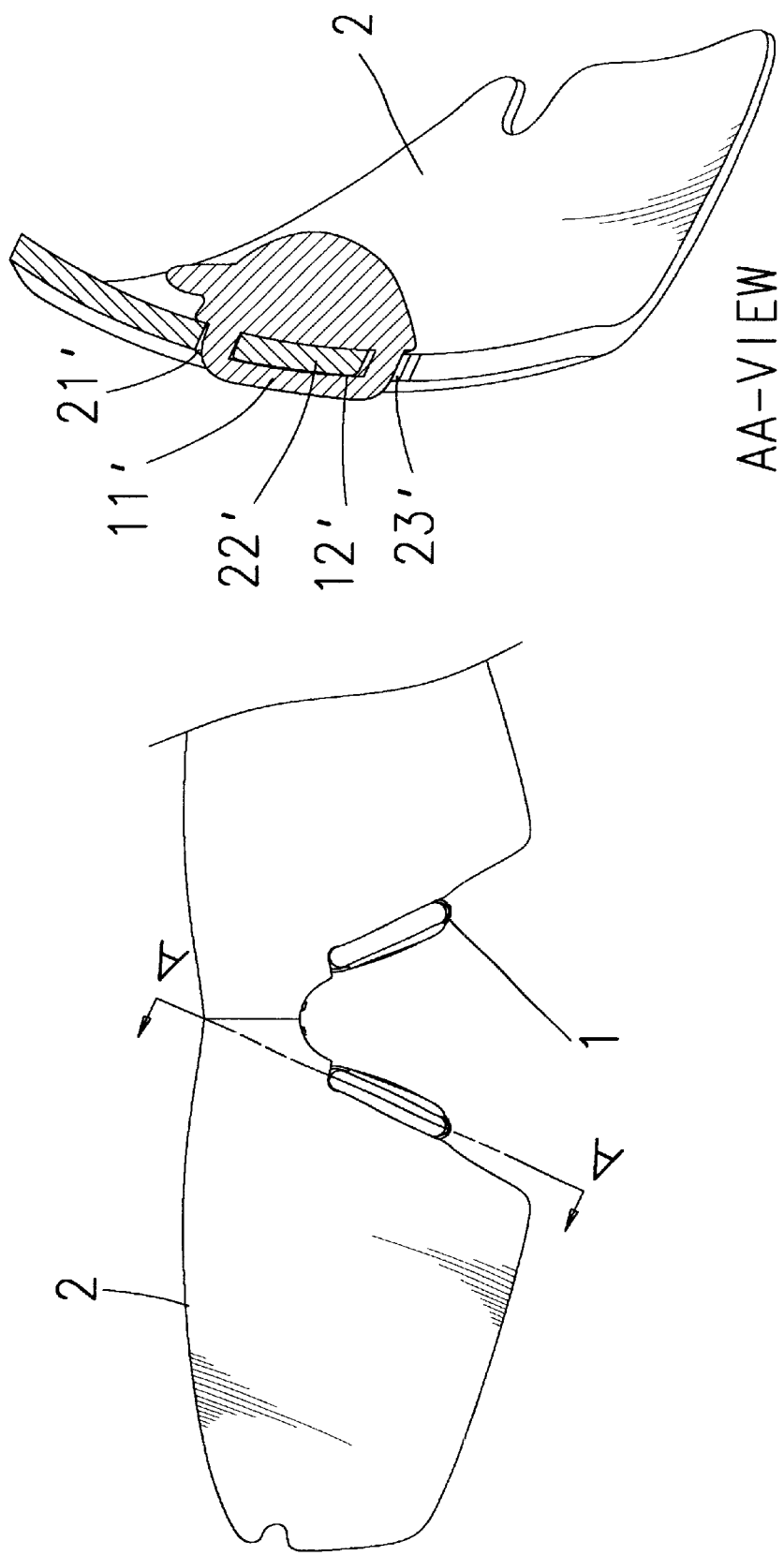
FIG. 4 is a front view of the one-piece lens nose-pad assembly in accordance with the present invention.

While being assembled, referring to FIGS. 4 and 4-1, each protruding block 22 or 22' is inserted into each hollow 12 or 12' of the inserting portion so as for each mounting rod 11 or 11' to be firmly secured to each side of the cutout portion with both ends of each mounting rod 11 or 11' respectively inlaid in each lateral concave 21 or 21' and barb 23 or 23'.

Figures 1, 5:
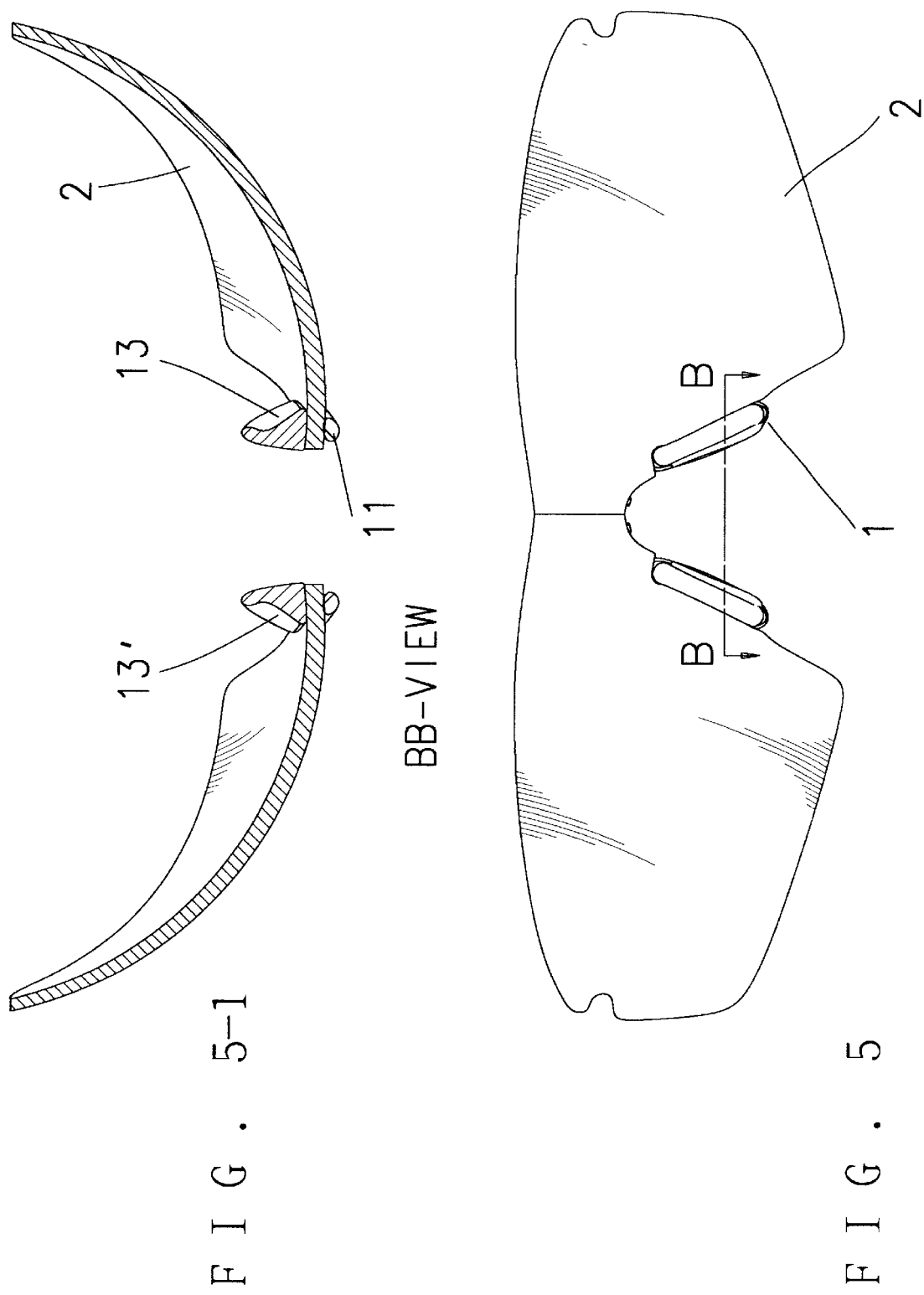
FIG. 5 is a front view of the one-piece lens nose-pad assembly in accordance with the present invention; and, FIG. 5-1 is a cross sectional view taken along lines B—B of FIG. 5.

Referring to FIGS. 5 and 5-1, while a sunglasses or safety glasses with the one-piece lens 2 being worn by a wearer with a bigger nose, each dented curve 13 or 13' of each inserting portion of the nose-pad 1 will be pushed inward to form a larger space for the wearer's big nose because the nose-pad 1 with dented curve 13 or 13' becomes thinner and provides excellent elasticity so as to make the wearer feel comfortable on the nose.

While the preferred embodiments of the invention have been described above, it will be recognized and understood that various modifications may be made therein and the appended claims are intended to cover all such modifications which may fall within the spirit and scope of the invention.

What is claimed is:

1. A one-piece lens nose-pad assembly comprising:

a nose-pad made of soft rubber having a pair of inserting portions respectively on the left and right sides, each said inserting portion having a mounting rod on the front, a hollow in the center and a dented curve provided on the rear surface; and, a one-piece lens having a nose-pad cutout portion in the bottom edge to receive said nose-pad, said cutout portion being provided with a lateral concave in the upper section of each side and a barb in the middle of each side, a protruding block being formed between said each lateral concave and said each barb on each side of said cutout portion, said each protruding block being inserted into said each hollow of said inserting portion so as for said each mounting rod be firmly secured to each side of said cutout portion with both ends of said each mounting rod respectively inlaid in said each lateral concave and said barb.

* * * * *